United States Patent [19]

Magee

[11] 4,183,175

[45] Jan. 15, 1980

[54] SELF-WATERING APPARATUS FOR GROWING PLANTS

[76] Inventor: Bervin W. Magee, 416 N. 4th Ave., Maywood, Ill. 60153

[21] Appl. No.: 738,480

[22] Filed: Nov. 3, 1976

[51] Int. Cl.² ............................................. A01G 27/00
[52] U.S. Cl. .............................................. 47/79; 47/58
[58] Field of Search ........................... 47/79, 80, 81, 58

[56] References Cited

U.S. PATENT DOCUMENTS

| | | | |
|---|---|---|---|
| 1,439,973 | 12/1922 | Olson | 47/80 |
| 2,058,934 | 10/1936 | Yohe | 47/79 |
| 2,084,005 | 6/1937 | Richards | 47/80 |
| 2,249,197 | 7/1941 | Brundin | 47/79 |
| 2,993,300 | 7/1961 | Sawyer | 47/81 |
| 3,576,088 | 4/1971 | Arca | 47/81 |
| 3,683,548 | 8/1972 | Hagerty | 47/81 |
| 3,758,986 | 9/1973 | Roberts | 47/79 |
| 4,023,305 | 5/1977 | Harschel | 47/81 |
| 4,052,818 | 10/1977 | Hagerty | 47/58 |

FOREIGN PATENT DOCUMENTS

| | | | |
|---|---|---|---|
| 157983 | 8/1939 | Fed. Rep. of Germany | 47/79 |
| 830581 | 3/1948 | Fed. Rep. of Germany | 47/80 |
| 2102897 | 7/1972 | France | 47/81 |
| 823330 | 11/1959 | United Kingdom | 47/80 |

OTHER PUBLICATIONS

"Lazy Maid" advertizing leaflet provided by applicant copyright Lazy Maid Planter Products.
Buckman, H. O. et al., "chapter 16.8-The Gaseous Losses of Soil Nitrogen",*The Nature and Properties of Soils* 7th ed., Macmillion Co., 1969 pp. 448–449.
Magee, B. W., *The Tap Root Care Principle* 1976 (printer, publisher unknown).
Green, J. L., "New Resource-Conserving Pot Facilitates Easy Pot Care", *Ornamentals Northwest* Cooperative Extension Service 6-7/77 pp. 6–8.
Anon. "Special: Media", *Ornamentals Northwest* Cooperative Extension Service 6/76 pp. 8–10.
Anon. advertisement of "Hydro-Pot" (T.M.) by Aird Inc. c/o Robert E. Bates, SO-5, 310-D Breesport, San Antonio, Texas 78216, ad provided by applicant; publication, date unknown.

*Primary Examiner*—Edgar S. Burr
*Assistant Examiner*—James R. Feyrer
*Attorney, Agent, or Firm*—Howard W. Clement; Joan I. Norek

[57] ABSTRACT

There is provided a self-watering apparatus for growing plants comprising a soil retaining compartment and a first and second water reservoir compartments, the first reservoir compartment being of substantially lesser cross-sectional area than the second. The second water reservoir compartment is open to the atmosphere and by virtue of an interconnection between the first and second reservoirs, maintains the water level in the first. The apparatus provides three zones through which a root grows, a soil zone, an air zone and a water zone, which air zone is maintained at high humidity by virtue of the small cross-sectional area of the first water reservoir zone, which prevents injury to roots growing into the water zone and encourages root growth toward the water zone.

20 Claims, 8 Drawing Figures

SELF-WATERING APPARATUS FOR GROWING PLANTS

BACKGROUND OF THE INVENTION

The present invention is directed to a self-watering apparatus for growing plants which requires only limited maintenance and provides an improved environment for root growth. Many types of planters for growing and cultivating plants are known and used in a variety of environments such as in the home, office, greenhouses and florist shops. Proper care of all cultivated plants demands that the plants receive adequate water and/or nourishing substances. Cultivated plants are often given water at intervals either by adding water to the top surface of the soil or by placing the planter in a container of water, allowing the water to be absorbed through bottom drainage holes. Planters adapted for these conventional watering methods have several disadvantages. Regardless of the methods of watering, there is a possibility that the soil surrounding the plant will receive too much water or water too often, resulting in root deterioration. A plant which does not receive sufficient water will of course also be adversely affected.

Water needs differ from plant to plant and are dependent upon many factors, including atmospheric environment and type of soil used. Determination of an individual plant's water needs is not a simple task for either the casual or professional plant grower. Also, a significant amount of time is required to watering conventional plants particularly when numerous plants are involved, such as in a greenhouse. For the casual grower, it may sometimes be inconvenient to water plants, such as during periods when no one is available to tend the plants. Many plant owners find it necessary to engage another's services in caring for the plant during periods of absence or risk loss of a plant from lack of water.

Planters which provide some "self-watering" by transportation of water from a separate reservoir to the surrounding soil by means of wicks, sponges or other water absorbent media are generally known. Another known method of automatic water transfer is by capillary action of water from a reservoir to the soil surrounding the plant, such as the use of the devices described in U.S. Pat. Nos. 3,866,351 and 2,713,753. These devices do not assure that the proper amount of water is transferred to the soil.

Devices for growing plants which include not only a separate water reservoir but also a means for access to such reservoir by plant's root(s) are also generally known, such as the devices described in U.S. Pat. Nos. 3,823,508, 2,713,749, 2,722,779 (dual reservoir), 3,660,933 and 954,550 and in Belgium Patent No. 513,373, French Patent No. 1,080,204 and West German Patent No. 1,003,489. Similar devices specifically adapted for roots of seeds are illustrated in U.S. Pat. Nos. 2,993,300 and 3,199,250.

It is the object of the present invention to provide an improved apparatus for growing plants which includes a receptacle with an upper compartment supporting the plant soil and the lower water reservoir divided into two compartments, the first from which the roots of the plant absorb water as needed, the second holding a reserve water supply, eliminating the need for watering at frequent time intervals which first compartment provides an advantageous environment for root growth. A further object of the invention is to provide such an improved apparatus for growing plants wherein the root structure of the plant absorbs water as needed from a separate water reservoir, eliminating the harmful effect of misjudgement of water requirement of the plant.

A further object of the invention is to provide an apparatus for growing plants wherein a relatively mature root will pass through three growth zones, an upper soil zone, a high humidity air zone and a water zone which zones encourage growth of a portion of a plant root structure from the soil zone to the water zone, allowing the water to be absorbed by the root directly from the water zone. A further object of the invention is to provide such an apparatus for growing plants wherein a baffle structure extends through a relatively large water reservoir to provide a localized air and water zone, maximizing the relative humidity and increasing the temperature of these zones, while retaining a reserve water reservoir from which the water level of the water zone is maintained.

These and other objects of the present invention are apparent from the following detailed description of the invention and drawings below.

DETAILED DESCRIPTION OF THE INVENTION

The invention is a self-watering apparatus for growing plants, a receptacle which includes three compartments, a soil retaining compartment, a first water reservoir compartment and a second water reservoir compartment, wherein the soil retaining compartment is separated from the reservoirs by a soil support wall. The soil retaining compartment and the first water reservoir compartment are interconnected by means of vents or apertures of such cross-sectional area to allow passage of a portion of a plant root structure from the soil retaining compartment to the first water reservoir compartment. The first water reservoir compartment is positioned along the periphery of the receptacle and is separated from the second water reservoir compartment by a continuous baffle structure which extends downwardly from the support wall. The two water reservoir compartments are provided with fluid interconnection at a position close to or near the bottom of the receptacle such as an opening between the lower edge of the baffle and the surface of the bottom wall of the receptacle or, if the baffle contacts the bottom wall, apertures in the baffle near its lower edge.

The inner second reservoir compartment is provided with an opening to the outer atmosphere such as a passageway extending from and through the support wall above the second reservoir compartment, through the soil retaining compartment to the open air. Water can be added to the second reservoir compartment through this interconnection to the atmosphere and the water is provided to the first reservoir compartment through the interconnection between the two reservoir compartments. When water levels of the two reservoir compartments are maintained at a height above the fluid interconnection between the two, the air contained above the surface of the water in the first reservoir is vented only to the soil retaining compartment. This contained air is the air zone. The soil retaining compartment, when the apparatus is in use, will contain the plant and the surrounding soil. The air above the water surface in the first reservoir is therefore exposed only to the water below and the soil above.

Self-watering of the plant is achieved by allowing the roots or a portion of the roots to grow from the soil zone through the vents between the soil compartment and the first water reservoir compartment, through the air zone and to the water zone (in the first water reservoir compartment) whereby the plant root will absorb water as needed and optionally nutrients or other substances dissolved in the water in the reservoir. This type of root growth is more fully described in the book THE TAP-ROOT PLANT CARE PRINCIPLE, by Bervin Winford Magee, Copyright 1976. The invention allows the plant to receive the correct amount of water without daily or weekly maintenance, the apparatus needing only replenishing of the water reservoir when the water level falls to a distance close to the interconnection between the two reservoirs. Such infrequent maintenance results in there being, at least at some time, a more than insignificant amount of air above the water through which the root must pass. Such an air pocket could be detrimental to the plant's root unless maintained at high humidity. The present invention requires therefore that the first water reservoir compartment, into which the root grows, has a relatively narrow cross-sectional area. The water level of this narrow first water reservoir is maintained over a long period of time by being interconnected to the second water reservoir compartment containing a greater amount of water. The air pockets above these two water reservoir compartments are physically separated. The moisture content of the air above the first water reservoir (air zone) thereby is independent of that above the second water reservoir and is maintained at a high humidity by virtue of the narrow cross-sectional area.

The high humidity of the air above the first water reservoir is advantageous not only to prevent injury to the root when it passes through this air pocket, but also facilitates and encourages root growth through the soil to the water in this first reservoir. That is, the moisture present in the soil will be the moisture that is absorbed onto the soil immediately above the first water reservoir through the vents, the water permeating the soil from this point. The roots will grow toward the portion of the soil that contains the highest amount of moisture and therefore be directed toward the vents and therefrom through the air zone and into the water zone of the first reservoir. Further, the localized first water reservoir includes only a minor extent of upper wall area unto which water vapor could condense, which condensation could decrease the amount of water absorbed by the soil.

DESCRIPTION OF THE DRAWINGS

With reference to FIGS. 1, 2 and 4, there is shown a receptacle designated generally by the numeral 10 which includes sides 12, continuous from the upper open edge 14 to the bottom wall 16. The sides 12 may have a circular cross-section as shown in FIGS. 1 and 2 or a square cross-section such as FIG. 4 or any other convenient shape and the sides 12 may define differing cross-sectional areas at points along the height of the receptacle, although the sides are continuous. The sides 12 may be molded in several pieces as long as the interconnection between the separate parts are air and liquid tight.

Figure 1:
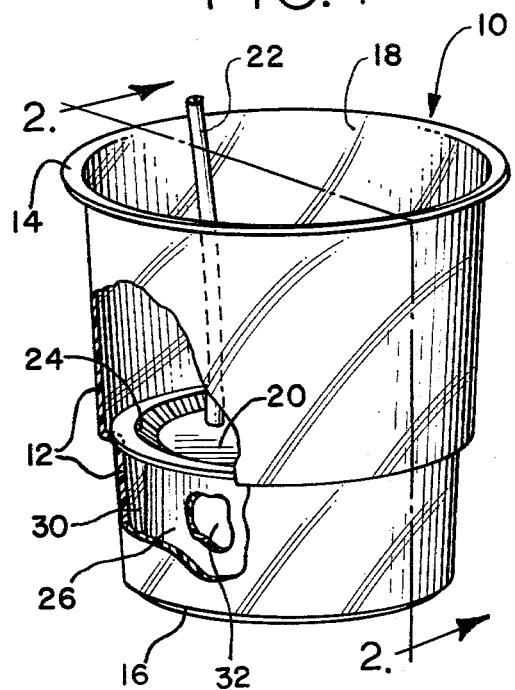
FIG. 1 is a partially cut-away perspective view of a planter embodying the features of the present invention.

At a position between the upper edge 14 and the bottom wall 16 there is provided a soil support platform, designated 20 in FIGS. 1 to 4. The soil support wall 20 is positioned substantially horizontal and in parallel alignment to the bottom wall 16 and along with the upper portion of the sides 12 defines a soil retaining compartment. Extending vertically from the lower surface of the support wall 20 is a continuous baffle, designated 26. The support wall 20 and the baffle 26 define a first and second water reservoir compartment, designated respectively 30 and 32, in the lower portion of the receptacle 10 and which are disposed along substantially the same horizontal plane.

The continuous baffle 26 generally is of the same cross-sectional shape as is the receptacle sides 12 and is positioned spaced apart and in substantially parallel alignment with the sides 12. The baffle 26 defines a first water reservoir 30 which extends along the periphery of the receptacle 14 and is substantially narrow and a second water reservoir 32 confined within the baffle 26. The second water reservoir 32 is interconnected to the outer atmosphere by means of a passageway 22 which extends through the support wall 20 at a position above the second water reservoir 32 through the soil retaining compartment 18 and ends above the upper edge of the receptacle 14.

Figure 3:
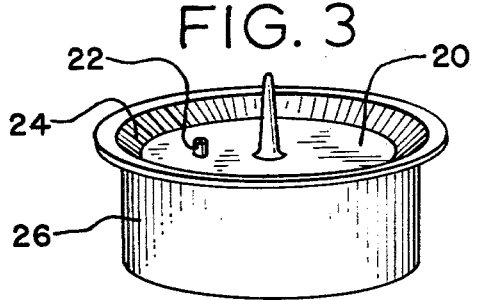
FIG. 3 is an elevational view of the support wall and baffle structure of FIGS. 1 and 2.
Figure 4:
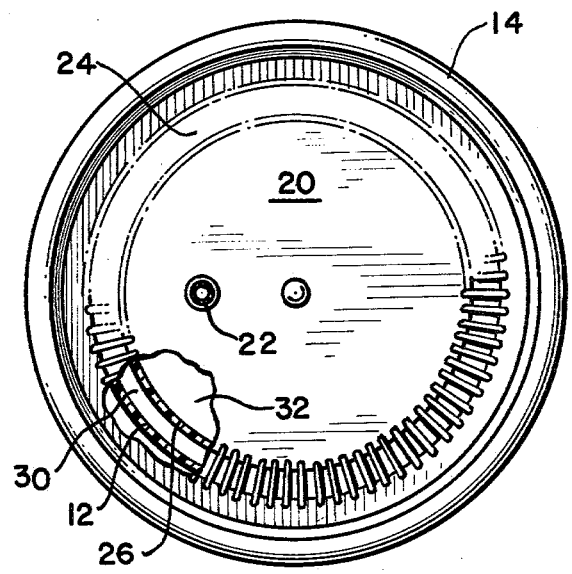
FIG. 4 is a top view of an apparatus embodying the features of the present invention.
Figure 5:
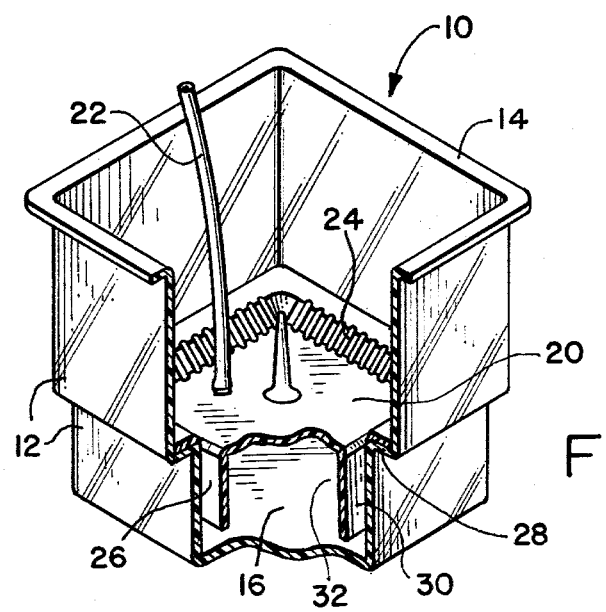
FIG. 5 is a partially cut-away perspective view of an apparatus embodying the present invention.
Figure 6:
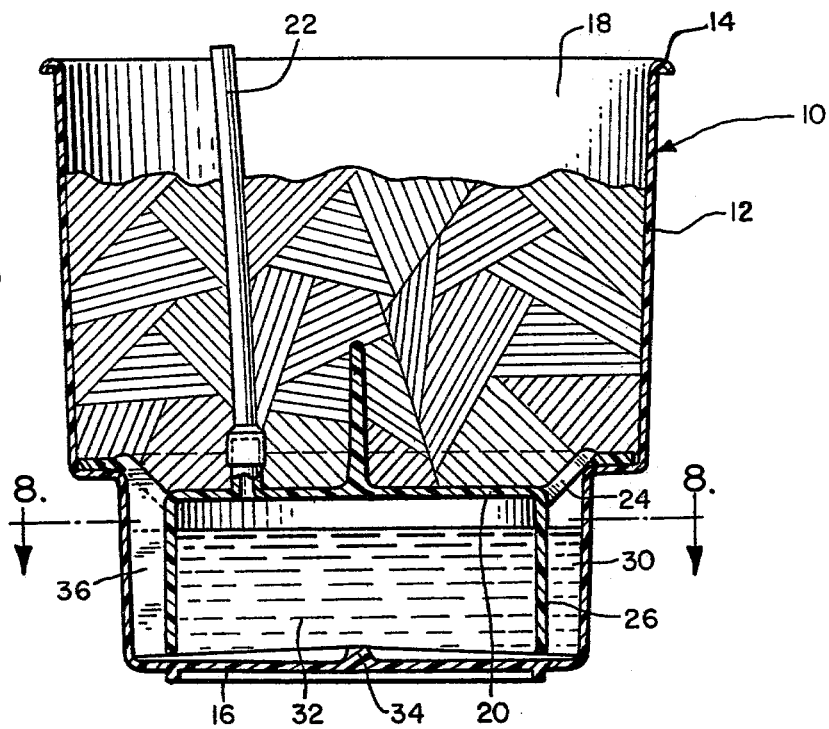
FIG. 6 is a cross-sectional view of a planter of the present invention.
Figure 7:
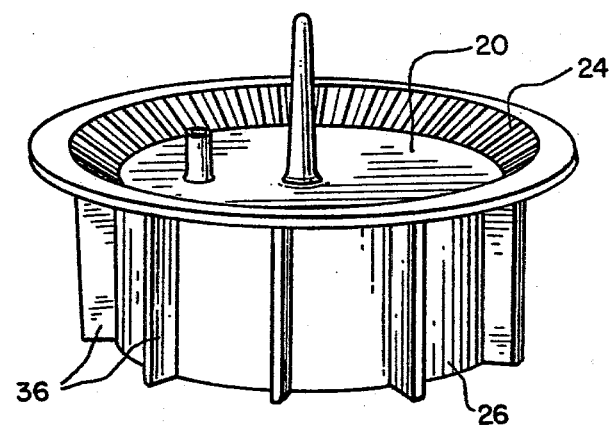
FIG. 7 is an elevational view of the support wall and baffle structure including the fins of FIG. 6.
Figure 8:
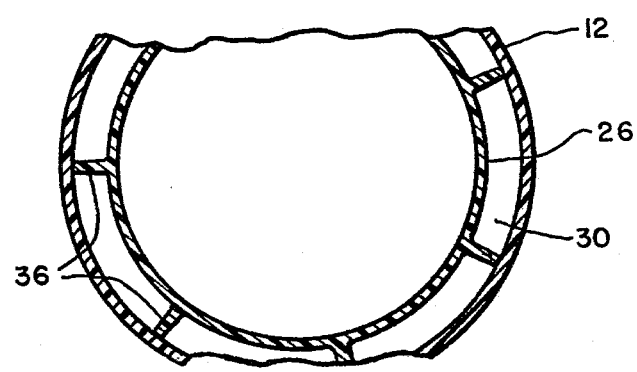
FIG. 8 is a sectional view of the planter taken along line 8 of FIG. 6.

The first water reservoir compartment 30 is open to the soil retaining compartment 18 by means of vents 24. These vents 24, as shown in FIGS. 1 and 3, may be apertures in the surface of the soil support wall 20 along the periphery, beyond the outer edge of the attached baffle 26. An alternative arrangement is shown in FIG. 5, wherein the support wall 20 is supported along its periphery by a shoulder 28 and the vents 24 are located along the shoulder 28.

Figure 2:
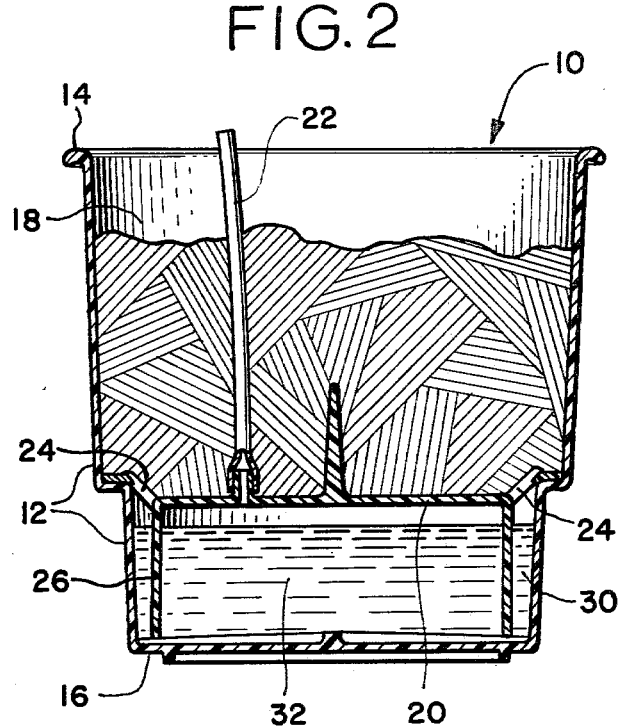
FIG. 2 is a cross-sectional view of the planter of the present invention along lines 2—2 of FIG. 1.

The two water reservoir compartments 30 and 32 are provided with fluid interconnections at a position close to or adjacent to the bottom wall 16. This interconnection may be provided by including ridges 34 along the inner surface of the bottom wall 16 which ridges 34 support the baffle 26 along only a portion of its length, such as is seen in FIG. 2. Alternatively, the baffle 26 and support wall 20 may be supported on a shoulder such as shoulder 28 in FIG. 5, and so proportioned that the lower edge of the baffle 26 is suspended above the bottom wall 16.

When water is contained in the reservoir compartments 30 and 32 at a level above the upper edge of the interconnection, the air above the surface of the water in each reservoir is separated by the baffle system. The air above the water surface in the first reservoir compartment is open to the soil retaining compartment. The water in the second reservoir compartment is open to the atmosphere through passage 22. The passage 22 provides additionally a means for replacing water in both reservoirs upon depletion.

As mentioned above, the two-compartmental arrangement of the water reservoir allows for a very narrow first reservoir 30 while maintaining a large water supply in the second reservoir compartment 32. It has been found that this arrangement provides a high relative humidity in the air above the water surface in the first reservoir compartment. It is preferred that the cross-sectional area of the first water reservoir, i.e. the horizontal distance between the baffle 26 and the side 12 of the receptacle, be in the range of about $\frac{1}{8}$ to $\frac{1}{2}$ inch. It is believed, although the present invention is not limited to any theory, that the moisture in the air between the baffle 26 and the side 12 of the receptacle is maximized by localizing and increasing three physical phenomena: capillary rise along the walls increasing the surface area of the water; water evaporation acceleration and temperature increase in this narrow confined area as more fully discussed below. It has been found that decreasing the distance between the inner surface of the sides of the receptacle and the outer surface of the baffle along the horizontal will increase the moisture in the air in the first water reservoir compartment and through the moisture latent atmosphere.

It also has been found that disturbance of the water surface in the second reservoir, such as by air currents or the like, results in a more pronounced fluctuation of the water level in the first water reservoir.

In a preferred embodiment of the present invention, the sides of the receptacle are transparent and outer surface of the baffle 16 is provided with a reflective coating which further increases the temperature of the water and the air in the first reservoir compartment. A further preferred embodiment provides a baffle constructed of and coated with a porous material such as porous clay, limestone or the like which absorb radiant energy, also raising the temperature of the first reservoir compartment. The coatings or heat absorbent materials would of course also be used in combination with transparent sides. A further embodiment is to provide a detachable sleeve that can be inserted around the baffle, such sleeve being of a reflective material or absorbent material as described above which will allow flexibility and choice of material and interchangeability of the material. A further preferred embodiment would be to provide a sleeve or series of sleeves for the baffle structure wherein, by use of a sleeve or a number of sleeves, the distance between the inner surface of the side and the baffle structure may be altered. A further preferred embodiment is to add additional wall structures within the first water reservoir, such as radially extending fins 36 secured to the outer surface of the baffle, to increase the humidity in the air above by increasing the effects of capillary action.

The present invention can also be adapted for agricultural uses wherein the self-watering apparatus could be in the form of an elongated rectangle in order to hold a large number of plants. For agricultural uses it may also be advantageous to incorporate float valves which would introduce water to the reservoirs automatically when needed. Float valves suitable for use with the present invention are well known to those with ordinary skill in the art and the selection and adaption of a suitable float valve system is within the ordinary skill of one in the art.

Although the present invention provides an apparatus which allows a plant to obtain all of the water it needs from the first water reservoir compartment, it may be advantageous to maintain a degree of moisture in the soil itself in order to effectuate transfer of soil nutrients to the root system. When the apparatus is used in agricultural application, the soil moisture may be maintained by an automatic sprinkling system activated by the level of moisture in the soil.

The above description of the invention and drawings are for illustration purposes and modifications in the form or structure may be made without departing from the spirit or scope of the present invention.

What is claimed is:

1. A method of maintaining a plant comprising:
providing an upper soil zone, a high humidity air zone and a water zone wherein a relatively mature root extends from said soil zone, through said high humidity air zone, into said water zone to absorb water directly from said water zone, and wherein the high humidity air zone is substantially isolated from the ambient atmosphere and the water zone is in fluid communication with a reservoir of water with a greater water holding capacity than said water zone; and
periodically supplying said reservoir with water.

2. A method of maintaining a plant comprising:
supporting a major proportion of the plant root system in soil in a soil retaining compartment which is disposed above a first water reservoir compartment;
preventing entry of any substantial amount of soil into said first reservoir compartment;
maintaining a water supply in said first water reservoir by periodic addition of water to a second water reservoir compartment which is in fluid communication with both said first reservoir compartment and the outer atmosphere and maintaining a high humidity air zone above the water surface by isolating it from communication with the ambient atmosphere;
allowing a portion of the plant root system to extend from said soil retaining compartment, through said high humidity air zone, to the water supply in said first reservoir compartment; and
preventing transportation of any substantial amount of water, as a liquid, from said first reservoir compartment to said soil retaining compartment.

3. The method of claim 2, further including periodic addition of water to said soil for transferring nutrients to the portion of the root system supported by said soil.

4. The method of claim 3, further including allowing evaporation of a portion of the water from said first reservoir compartment to a portion of said soil adjacent said high humidity air zone to encourage root growth to said high humidity air zone.

5. A substantially self-watering apparatus for growing plants adapted for use with an associated soil retaining compartment, comprising:
a first water reservoir compartment;
means for allowing growth of plant roots from said soil retaining compartment to said first water reservoir compartment but substantially preventing soil from said soil retaining compartment from entering said first water reservoir;
a second water reservoir compartment vented to the outer atmosphere;
means for allowing fluid communication between said first and second water reservoir compartments;
wherein said first water reservoir compartment is isolated from communication with the ambient atmosphere when at least partially filled with water and said soil retaining compartment contains soil and said first water reservoir being of substantially lesser cross-sectional area than said second water reservoir; and any roots growing from an associated soil retaining compartment to said first and second water reservoir compartments being substantially the only means for transporting water, in liquid form, from said first and second water reservoirs to said soil retaining compartment to supply the water uptake requirements of a plant disposed in said soil retaining compartment.

6. The apparatus of claim 5 wherein the first reservoir compartment includes an outer wall and an inner wall; and said outer wall is adapted to allow passage of radiant energy into said first reservoir compartment and inner wall is adapted to absorb radiant energy.

7. A substantially self-watering apparatus for growing plants comprising:

an upper soil retaining compartment;

a first water reservoir compartment;

means for allowing growth of plant roots from said soil retaining compartment to said first water reservoir compartment but substantially preventing soil from said soil retaining compartment from entering said first water reservoir;

a second water reservoir compartment vented to the outer atmosphere;

means for allowing fluid communication between said first and second water reservoir compartments;

said first water reservoir compartment having a substantially lesser cross-sectional water surface area than the second water reservoir compartment; and said apparatus not requiring means for transporting any substantial amount of water from said first and second water reservoirs to said soil retaining compartment.

8. The apparatus of claim 7 wherein the first reservoir compartment is defined at least in part by an outer wall and an inner wall;

said outer wall is adapted to allow passage of radiant energy into said first reservoir compartment and said inner wall is adapted to absorb radiant energy.

9. The apparatus of claim 7 wherein the first reservoir compartment includes an outer wall and an inner wall; and said outer wall is adapted to allow passage of radiant energy into said first reservoir compartment and said inner wall is adapted to absorb radiant energy.

10. A substantially self-watering apparatus for growing plants comprising:

a receptacle including a bottom wall and sides;

a substantially horizontally disposed soil support wall positioned above the bottom wall, said soil support wall, bottom wall, and the portion of the sides extending between the soil support wall and bottom wall defining a lower water reservoir, and the soil support wall and the portion of the sides extending above the soil support wall defining an upper soil retaining compartment;

a baffle extending from the soil support wall into the lower water reservoir in spaced apart alignment with the sides, said baffle defining a first reservoir compartment between the sides and the baffle, and a second reservoir compartment encompassed within the baffle, said first reservoir compartment being of substantially lesser cross-sectional area than said second reservoir compartment;

means for allowing fluid communication between the first and second reservoir compartments, substantially adjacent to said bottom wall, and arranged so that said baffle substantially prevents atmospheric communication between said first and second reservoir compartments when water is present in said lower water reservoir at a level above said fluid communication means between the first and second reservoir compartments;

means for allowing passage of at least a portion of a plant's root system from said soil retaining compartment to said first reservoir compartment but preventing entry of a substantial amount of soil from said soil retaining compartment to said first reservoir compartment, said means being the only communication between said first reservoir compartment and said upper soil retaining compartment; and means for allowing fluid communication between said second reservoir compartment and the atmosphere.

11. The apparatus of claim 10 wherein the shortest distance between said baffle and said sides of said receptacle being from about $\frac{1}{8}$ inch to about $\frac{1}{2}$ inch.

12. The apparatus of claim 10 wherein said means for allowing fluid communication between said second reservoir compartment and the atmosphere is a conduit that extends from an aperture in the support wall above said second reservoir compartment through said soil retaining compartment.

13. The apparatus of claim 10 further including a plurality of radially extending fins secured to the outer surface of the continuous baffle for providing increased surface area structure in said first reservoir compartment.

14. The apparatus of claim 10 wherein said root passage allowing and soil entry preventing means is a series of vents along the periphery of the soil support platform.

15. The apparatus of claim 14 wherein the soil support wall and baffle is an integral unit and is disposed a distance above the bottom wall to form said means for allowing fluid communication between said first and second reservoir compartment between the lower edge of said baffle and said bottom wall.

16. The apparatus of claim 15 wherein the soil support wall and continuous baffle are supported above the bottom wall by ridges on the inner surface of the bottom wall which contact the lower edge of the baffle at discontinuous intervals.

17. The apparatus of claim 15 wherein the soil support wall engages at least one shoulder along the inner surface of the receptacle sides at a distance above the bottom wall whereby said baffle and soil support wall are disposed a distance above said bottom wall.

18. The apparatus of claim 1 wherein the sides of the wall receptacle, at least along their height between the bottom wall and the soil support wall, are transparent.

19. The apparatus of claim 18 wherein the surface of the baffle adjacent to the sides of the receptacle is of a light reflecting material.

20. The apparatus of claim 18 wherein the surface of the baffle adjacent to the sides of the receptacle is of a radiant energy absorbing material.

* * * * *

UNITED STATES PATENT AND TRADEMARK OFFICE
CERTIFICATE OF CORRECTION

PATENT NO. : 4,183,175
DATED : January 15, 1980
INVENTOR(S) : Bervin W. Magee

It is certified that error appears in the above-identified patent and that said Letters Patent are hereby corrected as shown below:

Column 1, line 31, delete "to" and insert therefor --for--;

Column 1, line 32, delete "plants" first occurrence and insert therefor --planters--.

Signed and Sealed this

Twentieth Day of May 1980

[SEAL]

Attest:

SIDNEY A. DIAMOND

Attesting Officer  Commissioner of Patents and Trademarks